(12) United States Patent
An et al.

(10) Patent No.: US 9,356,283 B2
(45) Date of Patent: May 31, 2016

(54) POSITIVE ACTIVE MATERIAL FOR RECHARGEABLE LITHIUM BATTERY AND RECHARGEABLE LITHIUM BATTERY

(71) Applicant: SAMSUNG SDI CO., LTD., Yongin-si, Gyeonggi-do (KR)

(72) Inventors: Jung-Woo An, Yongin-si (KR); Sumihito Ishida, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 237 days.

(21) Appl. No.: 13/948,848

(22) Filed: Jul. 23, 2013

(65) Prior Publication Data

US 2014/0178749 A1   Jun. 26, 2014

(30) Foreign Application Priority Data

Dec. 21, 2012  (KR) .......................... 10-2012-0151251

(51) Int. Cl.
*H01M 4/36*   (2006.01)
*H01M 4/485*   (2010.01)
*H01M 4/505*   (2010.01)
*H01M 10/0525*   (2010.01)

(52) U.S. Cl.
CPC .............. *H01M 4/364* (2013.01); *H01M 4/485* (2013.01); *H01M 4/505* (2013.01); *H01M 10/0525* (2013.01); *Y02E 60/122* (2013.01)

(58) Field of Classification Search
CPC ....... H01M 4/364; H01M 4/505; H01M 4/52; H01M 4/525; H01M 4/5825; H01M 10/0525; H01M 4/485; Y02E 60/122
See application file for complete search history.

(56) References Cited

U.S. PATENT DOCUMENTS

| | | | |
|---|---|---|---|
| 2008/0213668 A1* | 9/2008 | Muraoka et al. | 429/231.95 |
| 2010/0279172 A1 | 11/2010 | Hwang et al. | |
| 2011/0274978 A1* | 11/2011 | Sheem et al. | 429/231.8 |
| 2013/0288118 A1* | 10/2013 | Kim et al. | 429/211 |
| 2013/0288125 A1* | 10/2013 | Sheem et al. | 429/212 |
| 2013/0288139 A1* | 10/2013 | Choi et al. | 429/338 |

FOREIGN PATENT DOCUMENTS

| | | |
|---|---|---|
| JP | 2011-029408 A | 2/2011 |
| JP | 2011-228293 A | 11/2011 |
| KR | 10-2009-0078128 A | 7/2009 |
| KR | 10-2010-0118825 A | 11/2010 |

\* cited by examiner

*Primary Examiner* — Laura Weiner
(74) *Attorney, Agent, or Firm* — Knobbe Martens Olson & Bear LLP

(57) ABSTRACT

In an aspect, a positive active material for a rechargeable lithium battery that includes a first positive active material; and a second positive active material including $Li_aMn_{1-x}M_xO_2$ (M is selected from Co, Ni, Mn, Fe. Cu, V, Si, Al, Sn, Pb, Sn, Ti, Sr, Mg, Ca or a combination thereof; x is $0 \leq x \leq 1.0$; and a is $0.9 \leq a \leq 1.1$) is disclosed.

9 Claims, 1 Drawing Sheet

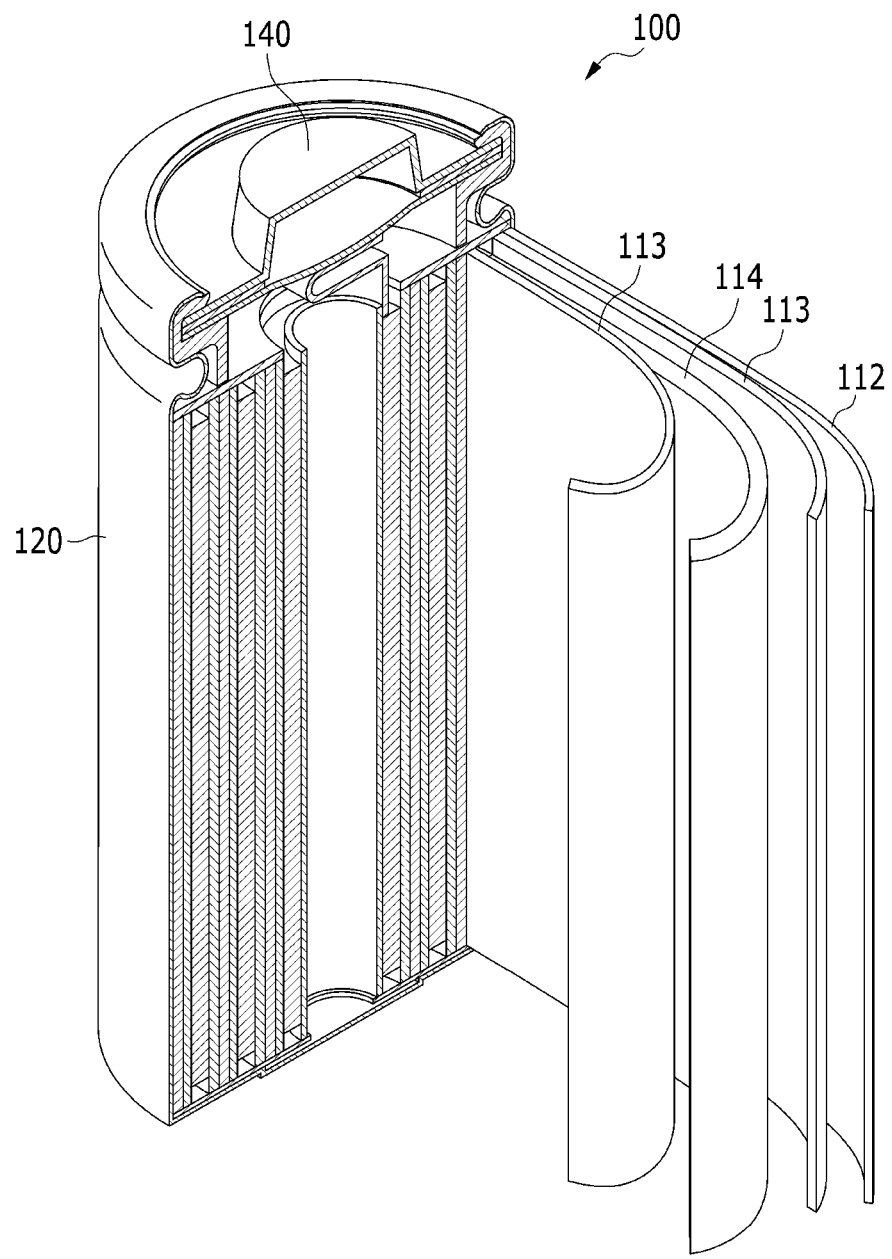

POSITIVE ACTIVE MATERIAL FOR RECHARGEABLE LITHIUM BATTERY AND RECHARGEABLE LITHIUM BATTERY

INCORPORATION BY REFERENCE TO RELATED APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2012-0151251 filed on Dec. 21, 2012 in the Korean Intellectual Property Office, the disclosure of which is incorporated in its entirety herein by reference.

BACKGROUND

1. Field

This disclosure relates to a positive active material for a rechargeable lithium battery and a rechargeable lithium battery including the same are disclosed.

2. Description of the Related Technology

Rechargeable lithium batteries have recently drawn attention as a power source for small portable electronic devices. They use an organic electrolyte and thereby have twice or more discharge voltage than that of a conventional battery using an alkali aqueous solution, and accordingly have high energy density.

As for a positive active material for a lithium rechargeable battery, a lithium-transition metal oxides being capable of intercalating lithium, such as $LiCoO_2$, $LiMn_2O_4$, $LiNi_{1-x}Co_xO_2$ (0<x<1), and the like, have been investigated.

As for a negative active material for a lithium rechargeable battery, various carbon-based materials such as artificial graphite, natural graphite, and hard carbon capable of intercalating and deintercalating lithium ions have been used. Since graphite, among the carbon-based materials, has a low discharge potential relative to lithium of about −0.2V, a battery using graphite as a negative active material has a high discharge potential of about 3.6V and excellent energy density. Furthermore, the graphite guarantees a long cycle life for a battery due to its outstanding reversibility hence it is widely used as a negative active material.

However, a graphite active material has a low density (theoretical density: about 2.2 g/cc) and consequently a low capacity in terms of energy density per unit volume in an electrode. Further, a battery may swell and thus, because graphite may side react with an organic electrolyte at a high discharge voltage have decreased capacity.

Alternative materials have been investigated in order to solve these problems in using graphite as a negative active material. For example, an oxide negative active material such as tin oxide, lithium vanadium-based oxide, and the like has recently been investigated. However, the oxide negative active material does not realize sufficient cell performance and thus, additional research is needed.

SUMMARY

A positive active material that compensates irreversible capacity of a negative electrode efficiently and improves capacity, efficiency, and cycle-life characteristics of rechargeable lithium battery is provided.

A rechargeable lithium battery having improved capacity, efficiency, and cycle-life characteristics is provided.

Some embodiments provide a positive active material for a rechargeable lithium battery that includes a first positive active material selected from lithium composite oxide including at least one metal selected from cobalt, manganese, nickel, and a combination thereof, lithium metal phosphate, and a combination thereof; and a second positive active material including $Li_aMn_{1-x}M_xO_2$ (M is selected from Co, Ni, Mn, Fe. Cu, V, Si, Al, Sn, Pb, Sn, Ti, Sr, Mg, Ca or a combination thereof; x is 0≤x≤1.0; and a is 0.9≤a≤1.1).

In some embodiments, the second positive active material may be included in an amount of about 2 wt % to about 40 wt % based on 100 wt % of the positive active material.

In some embodiments, the second positive active material may be included in an amount of about 2 wt % to about 30 wt % based on 100 wt % of the positive active material.

In some embodiments, the second positive active material may be a material of which structure is transformed from a layered structure to a spinel structure depending voltage increase at a first charge of a rechargeable lithium battery.

In some embodiments, the positive active material may further include activated carbon as a third positive active material.

In some embodiments, the third positive active material may be included in an amount of about 1 wt % to about 30 wt % based on 100 wt % of the positive active material.

In some embodiments, the first positive active material may be selected from $LiCoO_2$, $LiNiO_2$, $LiMn_2O_4$, lithium nickel cobalt manganese-based oxide, lithium nickel aluminum cobalt-based oxide, $LiFePO_4$, $LiNiPO_4$, $LiCoPO_4$, and a combination thereof. In some embodiments, the first positive active material may be $LiCoO_2$. In some embodiments, the first positive active material may be $LiNi_{0.8}Co_{0.15}Al_{0.05}O_2$. In some embodiments, the first positive active material may be $LiFePO_4$.

Some embodiments provide a rechargeable lithium battery including a positive electrode including the positive active material; a negative electrode including a negative active material; and a non-aqueous electrolyte.

In some embodiments, the non-aqueous electrolyte may include a lithium salt and a non-aqueous organic solvent.

The positive active material compensates irreversible capacity of a negative electrode efficiently, and simultaneously lowers resistance between positive active material particles, and thus the rechargeable lithium battery including the same has improved capacity, efficiency, and cycle-life characteristics.

BRIEF DESCRIPTION OF THE DRAWING

FIG. 1 is a schematic view of a rechargeable lithium battery according to one embodiment of the present disclosure.

DETAILED DESCRIPTION

Exemplary embodiments of the present disclosure will hereinafter be described in detail. However, these embodiments are only exemplary, and the present disclosure is not limited thereto.

Some embodiments provide a positive active material for a rechargeable lithium battery includes a first positive active material selected from lithium composite oxide including at least one metal selected from cobalt, manganese, nickel, and a combination thereof, lithium metal phosphate, and a combination thereof; and a second positive active material including $Li_aMn_{1-x}M_xO_2$ (M is selected from Co, Ni, Mn, Fe. Cu, V, Si, Al, Sn, Pb, Sn, Ti, Sr, Mg, Ca or a combination thereof; x is 0≤x≤1.0; and a is 0.9≤a≤1.1).

In some embodiments, the second positive active material may be $Li_aMn_{1-x}M_xO_2$ (M is selected from Co, Ni, Mn, Fe. Cu, V, Si, Al, Sn, Pb, Sn, Ti, Sr, Mg, Ca or a combination thereof; x is 0≤x≤1.0; and a is 0.9≤a≤1.1) manufactured by doping $Li_aMnO_2$ with a metal element selected from Co, Ni, Mn, Fe. Cu, V, Si, Al, Sn, Pb, Sn, Ti, Sr, Mg, Ca or a combination thereof.

In some embodiments, the positive active material is provided as a mixture of the first positive active material and the second active material of $Li_aMn_{1-x}M_xO_2$ (M is selected from Co, Ni, Mn, Fe. Cu, V, Si, Al, Sn, Pb, Sn, Ti, Sr, Mg, Ca or a combination thereof; x is 0≤x≤1.0; and a is 0.9≤a≤1.1), wherein the first positive active material may be a transition metal oxide including Li and having an excellent reversibility; and the second positive active material may be activated at a lower voltage than the first positive active material and changed from the layered structure to a spinel structure by increasing a voltage during the charge and discharge.

In some embodiments, the second positive active material of $Li_aMn_{1-x}M_xO_2$ (M is selected from Co, Ni, Mn, Fe. Cu, V, Si, Al, Sn, Pb, Sn, Ti, Sr, Mg, Ca or a combination thereof; x is 0≤x≤1.0; and a is 0.9≤a≤1.1) has a layered structure, and the layered structure is maintained until about 3V on the charge above which a single layer is used as a positive active material. However, the capacity does not increase since the layered structure is changed to a spinel structure ($Li_xMn_2O_4$, 0<x≤1) when the voltage reaches to 4V by increasing voltage after reaching 3V. Accordingly, it may be insufficient for a battery in the view of capacity, and the reversibility is inferior due to the structure change.

In some embodiments, the positive active material may be prepared by mixing the first positive active material and the second positive active material rather than using only one of them in order to achieve the high capacity. Typically, the positive active material has irreversible capacity, and the irreversible capacity of the positive active material is generated by emitting Li from the layered $Li_aMn_{1-x}M_xO_2$ of the second positive active material at the less than about 3V. When increasing the voltage to greater than or equal to about 3V, the layered $Li_aMn_{1-x}M_xO_2$ of the second positive active material may be changed into a spinel structure ($Li_xMn_2O_4$, 0<x≤1) having a reversible capacity. In some embodiments, the positive active material may further increase the capacity of rechargeable lithium battery due to the reversible capacity.

In some embodiments, when $Li_aMn_{1-x}M_xO_2$ of the second positive active material is structurally transformed from a layer structure into a spinel structure in the first charge, a relatively large expansion occurs. The density in the electrode is increased by the large expansion causing closer contact between the active material particles. Thereby, the contact resistance between active material particles is decreased, and the conductivity may be improved. Resultantly, the rechargeable lithium battery including the positive active material may have low resistance and high power so as to provide excellent output characteristics. In addition, since having low resistance at high rate charge and discharge, the rechargeable lithium battery may have excellent cycle characteristics. For example, when applied to the rechargeable lithium battery having a jelly-roll electrode assembly structure, the cycle-life characteristics may be improved since suppressing the gasifying phenomenon caused by the side reaction due to the density increase.

In some embodiments, the second positive active material may be included in an amount of about 2 wt % to about 40 wt %, and specifically about 2 wt % to about 30wt %, or about 10 wt % to about 15 wt % based on 100 wt % of the positive active material. In some embodiments, the positive active material may provide an appropriate irreversible capacity and also accomplish a positive electrode with a high capacity by including the ranged amount of the second positive active material.

In some embodiments, the positive active material may further include a third positive active material of an activated carbon (produced from raw material such as pitch-based, coconut shells, charcoal or the like). When the positive active material including the third positive active material with a mixture of the first positive active material and the second positive active material is applied to a rechargeable lithium battery, the rate capability and cycle-life characteristics of battery may be further improved.

In some embodiments, the third positive active material may be included in an amount of about 1 wt % to about 30 wt %, and specifically about 5 wt % to about 30 wt %, or about 10 wt % to about 15wt % based on 100 wt % of the positive active material. Since the positive active material includes the third positive active material within the range, the positive electrode for improving the rate capability and the cycle-life characteristics without the severe decreases in capacity may be accomplished.

In some embodiments, the first positive active material may be any compound (lithiated intercalation compound) being capable of intercalating an deintercallating lithium reversibly without limitation, and for example may be lithium composite oxide including at least one metal selected from cobalt, manganese, nickel, and a combination thereof, lithium metal phosphate, and a combination thereof as described above. More specific example of the lithium composite oxide including at least one metal selected from cobalt, manganese, nickel, and a combination thereof may be the compounds represented by the following chemical formulae:

$Li_aA_{1-b}R_bD^1_2$ (0.90≤a≤1.8 and 0≤b≤0.5);

$Li_aE_{1-b}R_bO_{2-c}D^1_c$ (0.90≤a≤1.8, 0≤b≤0.5 and 0≤c≤0.05);

$LiE_{2-b}R_bO_{4-c}D^1_c$ (0≤b≤0.5, 0≤c≤0.05);

$Li_aNi_{1-b-c}Co_bR_cD^1_\alpha$ (0.90≤a≤1.8, 0≤b≤0.5, 0≤c≤0.05 and 0<α≤2);

$Li_aNi_{1-b-c}Co_bR_cO_{2-\alpha}Z_\alpha$ (0.90≤a≤1.8, 0≤b≤0.5, 0≤c≤0.05 and 0<α<2);

$Li_aNi_{1-b-c}Co_bR_cO_{2-\alpha}Z_2$ (0.90≤a≤1.8, 0≤b≤0.5, 0≤c≤0.05 and 0<α<2);

$Li_aNi_{1-b-c}Mn_bR_cD^1_\alpha$ (0.90≤a≤1.8, 0≤b≤0.5, 0<c≤0.05 and 0<α≤2);

$Li_aNi_{1-b-c}Mn_bR_cO_{2-\alpha}Z_\alpha$ (0.90≤a≤1.8, 0≤b≤0.5, 0≤c≤0.05 and 0<α<2);

$Li_aNi_{1-b-c}Mn_bR_cO_{2-\alpha}Z_2$ (0.90≤a≤1.8, 0≤b≤0.5, 0≤c≤0.05 and 0<α<2);

$Li_aNi_bE_cG_dO_2$ (0.90≤a≤1.8, 0≤b≤0.9, 0≤c≤0.5 and 0.001≤d≤0.1);

$Li_aNi_bCo_cMn_dGeO_2$ (0.90≤a≤1.8, 0≤b≤0.9, 0≤c≤0.5, 0≤d≤0.5 and 0.001≤e≤0.1);

$Li_aNiG_bO_2$ (0.90≤a≤1.8 and 0.001≤b≤0.1);

$Li_aCoG_bO_2$ (0.90≤a≤1.8 and 0.001≤b≤0.1);

$Li_aMnG_bO_2$ (0.90≤a≤1.8 and 0.001≤b≤0.1);

$Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); $LiFePO_4$; $LiNiPO_4$; $LiCoPO_4$.

In the above chemical formulae, A may be Ni, Co, Mn, or a combination thereof; R may be Al, Ni, Co, Mn, Cr, Fe, Mg, Sr, V, a rare earth, or a combination thereof; $D^1$ may be O (oxygen), F (fluorine), S (sulfur), P (phosphorus), or a combination thereof; E may be Co, Mn, or a combination thereof; Z may be F (fluorine), S (sulfur), P (phosphorus), or a combination thereof; G may be Al, Cr, Mn, Fe, Mg, La, Ce, Sr, V, or a combination thereof; Q may be Ti, Mo, Mn, or a combination thereof; T may be Cr, V, Fe, Sc, Y, or a combination thereof; and J may be V, Cr, Mn, Co, Ni, Cu, or a combination thereof.

In some embodiments, the positive active material may be a compound with the coating layer on the surface or a mixture of the active material and a compound with the coating layer thereon. In some embodiments, the coating layer may include at least one coating element compound selected from the group consisting of an oxide of the coating element, a hydroxide of the coating element, an oxyhydroxide of the coating element, an oxycarbonate of the coating element, and a hydroxycarbonate of the coating element. In some embodiments, the compound for the coating layer may be either amorphous or crystalline. In some embodiments, the coating element included in the coating layer may be Mg, Al, Co, K, Na, Ca, Si, Ti, V, Sn, Ge, Ga, B, As, Zr, or a mixture thereof. In some embodiments, the coating process may include any conventional processes unless it causes any side effects on the properties of the positive active material (e.g., spray coating, immersing), which is well known to those who have ordinary skill in this art and will not be illustrated in detail.

In some embodiments, the first positive active material may be selected from $LiCoO_2$, $LiNiO_2$, $LiMn_2O_4$, lithium nickel cobalt manganese-based oxide, lithium nickel aluminum cobalt-based oxide, $LiFePO_4$, $LiNiPO_4$, $LiCoPO_4$, and a combination thereof.

Some embodiments provide a rechargeable lithium battery includes a positive electrode including the positive active material; a negative electrode including a negative active material; and a non-aqueous electrolyte.

Rechargeable lithium batteries may be classified as lithium ion batteries, lithium ion polymer batteries, and lithium polymer batteries according to the presence of a separator and the kind of electrolyte used therein. In some embodiments, the rechargeable lithium batteries may have a variety of shapes and sizes, and include cylindrical, prismatic, coin, or pouch-type batteries, and may be thin film batteries or may be rather bulky in size. Structures and fabricating methods for lithium ion batteries pertaining to the present invention are well known in the art.

FIG. 1 is an exploded perspective view of a rechargeable lithium battery according to one embodiment. Referring to FIG. 1, the rechargeable lithium battery 100 includes a negative electrode 112, a positive electrode 114, and a separator 113 interposed between the negative electrode 112 and the positive electrode 114, an electrolyte (not shown) impregnated in the negative electrode 112, the positive electrode 114, and the separator 113, and a sealing member 140 sealing the battery case 120. In some embodiments, rechargeable lithium battery 100 may be fabricated by sequentially stacking the negative electrode 112, positive electrode 114, and separator 113, spiral-winding the resultant, and accommodating the spiral-wound body in the battery case 120.

In some embodiments, the rechargeable lithium battery may further include a separator or an electrolyte, and may be classified into lithium ion batteries, lithium ion polymer batteries, and lithium polymer batteries according to the presence of a separator and the kind of electrolyte used in the battery. In some embodiments, the rechargeable lithium batteries may have a variety of shapes and sizes, and include cylindrical, prismatic, coin-type, or pouch-type batteries, and may be bulk or thin film batteries according to sizes. Structures and fabrication methods for these batteries are well known in the art, and thus their detailed description is not provided.

In some embodiments, the positive electrode may include a current collector and a positive active material layer formed on the current collector.

In some embodiments, the positive active material is the same as described above.

In some embodiments, the positive active material layer further includes a binder and a conductive material.

The binder improves binding properties of the positive active material particles to one another and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoro ethylene, polyvinylidenefluoride, polyethylene, polypropylene, a styrene-butadiene rubber, an acrylated styrene-butadiene rubber, an epoxy resin, nylon, and the like but are not limited thereto.

The conductive material improves electrical conductivity of a negative electrode. Any electrically conductive material can be used as a conductive agent unless it causes a chemical change. Examples of the conductive material include at least one selected from natural graphite, artificial graphite, carbon black, acetylene black, ketjen black, a carbon fiber, a metal powder or a metal fiber including copper, nickel, aluminum, silver, and the like. A conductive material such as a polyphenylene derivative and the like may be mixed with a binder.

The current collector may be Al but is not limited thereto.

In some embodiments, the negative electrode includes a current collector and a negative active material layer disposed thereon. In some embodiments, the negative active material layer includes a negative active material.

In some embodiments, the negative active material includes a material that reversibly intercalates/deintercalates lithium ions, a lithium metal, a lithium metal alloy, a material being capable of doping and dedoping lithium, or a transition metal oxide, without limitation.

In some embodiments, the material that reversibly intercalates/deintercalates lithium ions includes a carbon material. The carbon material may be any generally-used carbon-based negative active material in a lithium ion rechargeable battery. Examples of the carbon material include crystalline carbon, amorphous carbon, and a mixture thereof. In some embodiments, the crystalline carbon may be non-shaped or sheet, flake, spherical, or fiber shaped natural graphite or artificial graphite. In some embodiments, the amorphous carbon may be a soft carbon, a hard carbon, a mesophase pitch carbonized product, fired coke, and the like.

In some embodiments, the lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. In some embodiments, the lithium metal alloy may be an alloy of lithium and a metal selected from Na, K, Rb, Cs, Be, Mg, Ca, Sr, Si, Sb, Pb, In, Zn, Ba, Ge, Al, and Sn.

In some embodiments, the material being capable of doping and dedoping lithium may include Si, $SiO_x$ (0<x<2), a Si—C composite, a Si-Q alloy (wherein Q is an alkali metal, an alkaline-earth metal, Group 13 to 16 elements, a transition element, a rare earth element, or a combination thereof, and not Si), Sn, $SnO_2$, a Sn—C composite, a Sn—R alloy (wherein R is an alkali metal, an alkaline-earth metal, Group 13 to 16 elements, a transition element, a rare earth element, or a combination thereof, and not Sn), and the like. In some embodiments, the elements Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. In some embodiments, the elements Q and R may be Mg, Ca, Sr, Ba, Sc, Y, Ti, Zr, Hf, V, Nb, Ta, Cr, Mo, W, Re, Fe, Pb, Ru, Os, Rh, Ir, Pd, Pt, Cu, Ag, Au, Zn, Cd, B, Al, Ga, Sn, In, Tl, Ge, P, As, Sb, Bi, S, Se, Te, or a combination thereof. In some embodiments, the material may include SiO coated with carbon.

In some embodiments, the transition metal oxide may include vanadium oxide, lithium vanadium oxide, and the like.

By assembling the negative electrode having a high-capacity but high irreversible capacity material with the positive electrode, the rechargeable lithium battery may accomplish the high-capacity and excellent cycle characteristics. In some embodiments, the negative active material may be selected from silicon (Si), tin (Sn), a silicon alloy, a tin alloy, silicon-based oxide, silicon-based carbide, silicon-based nitride, tin-based oxide, tin-based carbide, tin-based nitride, amorphous carbon, and a combination thereof. Thereby, even though the negative active material includes a material having high-capacity but high irreversible capacity, the positive active material may effectively compensate the irreversible capacity of negative electrode, so as to effectively utilize the high-capacity characteristics of the negative active material.

In some embodiments, the material having high-capacity but high irreversible capacity may be amorphous carbon in the negative active material. As more specific examples, the amorphous carbon may be hard carbon, a mesophase pitch carbonized product, fired cokes, and the like.

In some embodiments, the amorphous carbon may be amorphous carbon obtained by being fired at about 400° C. to about 1500° C.

In some embodiments, the negative active material layer includes a binder, and optionally a conductive material.

In some embodiments, the binder improves binding properties of negative active material particles with one another and with a current collector. Examples of the binder may include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In some embodiments, the conductive material may be included to improve electrode conductivity. Any electrically conductive material may be used as a conductive material unless it causes a chemical change. Examples of the conductive material include natural graphite, artificial graphite, carbon black, acetylene black, ketjen black, a carbon fiber, a metal powder or a metal fiber including copper, nickel, aluminum, silver, and so on, a polyphenylene derivative, or mixtures thereof.

In some embodiments, the current collector may be selected from the group consisting of a copper foil, a nickel foil, a stainless steel foil, a titanium foil, a nickel foam, a copper foam, a polymer substrate coated with a conductive metal, and combinations thereof.

In some embodiments, the negative electrode and the positive electrode may be manufactured by a method including mixing an active material, a binder, and a conductive material in a solvent to prepare an active material composition, and coating the composition on a current collector. In some embodiments, the solvent includes N-methylpyrrolidone and the like, but is not limited thereto.

In some embodiments, the electrolyte includes a non-aqueous organic solvent and a lithium salt.

The non-aqueous organic solvent serves as a medium for transmitting ions taking part in the electrochemical reaction of a battery.

In some embodiments, the non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, 1,1-dimethylethyl acetate, methylpropinonate, ethylpropinonate, γ-butyrolactone, decanolide, valerolactone, mevalonolactone, caprolactone, and the like. In some embodiments, the ether-based solvent may include dibutyl ether, tetraglyme, diglyme, dimethoxyethane, 2-methyltetrahydrofuran, tetrahydrofuran and the like, and the ketone-based solvent may include cyclohexanone, and the like. In some embodiments, the alcohol-based solvent may include ethanol, isopropyl alcohol, and the like. In some embodiments, the aprotic solvent include nitriles such as R—CN (wherein R is a C2 to C20 linear, branched, or cyclic hydrocarbon group, and may include a double bond, an aromatic ring, or an ether bond), amides such as dimethylformamide, dioxolanes such as 1,3-dioxolane, sulfolanes, and the like.

In some embodiments, the non-aqueous organic solvent may be used singularly or in a mixture. When the organic solvent is used in a mixture, its mixture ratio can be controlled in accordance with desirable performance of a battery.

In some embodiments, the carbonate-based solvent may include a mixture of a cyclic carbonate and a linear carbonate. In some embodiments, the cyclic carbonate and the linear carbonate are mixed together in a volume ratio of about 1:1 to about 1:9, which may enhance performance of an electrolyte.

In some embodiments, the non-aqueous organic solvent may be prepared by further adding the aromatic hydrocarbon-based organic solvent to the carbonate-based solvent. In some embodiments, the carbonate-based solvent and the aromatic hydrocarbon-based organic solvent are mixed together in a volume ratio of about 1:1 to about 30:1.

In some embodiments, the aromatic hydrocarbon-based organic solvent may be an aromatic hydrocarbon-based compound represented by the following Chemical Formula 1:

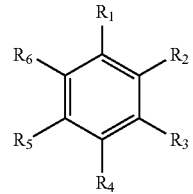

Chemical Formula 1 wherein in Chemical Formula 1, $R_1$ to $R_6$ are independently hydrogen, halogen, a C1 to C10 alkyl group, a C1 to C10 haloalkyl group, or a combination thereof.

In some embodiments, the aromatic hydrocarbon-based organic solvent may be benzene, fluorobenzene, 1,2-difluorobenzene, 1,3-difluorobenzene, 1,4-difluorobenzene, 1,2,3- trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In some embodiments, the non-aqueous electrolyte may further include vinylene carbonate or an ethylene carbonate-based compound represented by the following Chemical Formula 2 in order to improve cycle-life of a battery:

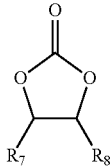

Chemical Formula 2 wherein in Chemical Formula 2, $R_7$ and $R_8$ are each independently hydrogen, a halogen, a cyano group (CN), a nitro group ($NO_2$) or a C1 to C5 fluoroalkyl group, provided that at least one of $R_7$ and $R_8$ is a halogen, a cyano group (CN), a nitro group ($NO_2$) or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. In some embodiments, the use amount of the vinylene carbonate or the ethylene carbonate-based compound for improving cycle life may be adjusted within an appropriate range.

The lithium salt is dissolved in the non-aqueous solvent and supplies lithium ions in a rechargeable lithium battery, and basically operates the rechargeable lithium battery and improves lithium ion transfer between positive and negative electrodes. In some embodiments, the lithium salt include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers of 1 to 20, respectively), LiCl, LiI, $LiB(C_2O_4)_2$ (lithium bis(oxalato) borate), or a combination thereof. In some embodiments, the lithium salt may be used in a concentration of about 0.1M to about 2.0M. When the lithium salt is included within the above concentration range, it may electrolyte performance and lithium ion mobility due to optimal electrolyte conductivity and viscosity.

In some embodiments, the separator 113 may include any materials commonly used in the conventional lithium battery as long as separating a negative electrode 112 from a positive electrode 114 and providing a transporting passage of lithium ion. That is, the material may have a low resistance to ion transport and an excellent impregnation for electrolyte solution. For example, it may be selected from glass fiber, polyester, polyethylene, polypropylene, polytetrafluoroethylene (PTFE), or a combination thereof. In some embodiments, the material may have a form of a non-woven fabric or a woven fabric. For example, for the lithium ion battery, polyolefin-based polymer separator such as polyethylene, polypropylene or the like is mainly used. In order to ensure the heat resistance or mechanical strength, a coated separator including a ceramic component or a polymer material may be used. Selectively, it may have a mono-layered or multi-layered structure.

The following examples illustrate the present invention in more detail. These examples, however, should not in any sense be interpreted as limiting the scope of the present invention.

EXAMPLES

Example 1

Fabrication of Positive Electrode

A first positive active material was prepared with $LiCoO_2$ having an average particle diameter of 5 μm (manufactured from Umicore, Brussels, Belgium)

Also a second positive active material was prepared with $LiMnO_2$ synthesized as fellow:

10 g of lithium hydroxide hydrate and 700 g of potassium hydroxide were thoroughly mixed and completely dissolved in 1 L of distilled water and further treated with 10 g of manganese oxide ($Mn_2O_3$) and thoroughly mixed. Then the beaker containing the mixture was input in a hydrothermal reactor and hydrothermal treated at 220° C. for 8 hours. After completing the hydrothermal treatment, the beaker was removed from the autoclave (container for treating at a high temperature and high pressure) when the temperature of content was about 60° C., and the produced powder was cleaned with methanol to remove excess lithium hydroxide and potassium hydroxide, filtered and dried to provide $LiMnO_2$. The obtained $LiMnO_2$ was pulverized with a ball mill to afford a second positive active material having an average particle diameter of 5 μm.

75 wt % of the first positive active material of $LiCoO_2$ (LCO), 15 wt % of the second positive active material of the synthesized $LiMnO_2$, 5 wt % of a conductive material of acetylene black (AB) (DENKA Co.; New York, N.Y.), and 5 wt % of a binder of PVDF (polyvinylidene fluoride, Kureha, New York, N.Y.) were mixed with an appropriate amount of NMP (N-methyl-2-pyrrolidone) to provide a slurry and coated on an Al-foil having a thickness of 15 μm and dried at 100° C. and compressed to provide a positive electrode having a density of 3.0 g/cc and a thickness of 120 μm.

Fabrication of Negative Electrode

A phenol resin was cured and then fired at 1500° C. under an inactive atmosphere to afford a solid. The obtained solid was pulverized by a ball mill until an average particle diameter of 10 μm to provide an amorphous carbon (Hard Carbon: HC).

85 wt % of the amorphous carbon, 5 wt % of acetylene black (AB), and 10 wt % of a binder of PVDF were mixed with an appropriate amount of NMP to afford a slurry. The slurry was coated on a 15 μm Cu-foil and dried at 100° C. and compressed to provide a negative electrode having a density of 1.0 g/cc and a thickness of 90 μm.

Separator

A separator was prepared with a 25 μm microporous layer of polyethylene.

Electrolyte Solution

An electrolyte solution was prepared with 1.0M $LiPF_6$ and EC:EMC (ethylmethyl carbonate)=3:7 (volume ratio).

Fabrication of Rechargeable Lithium Battery Cell

A separator was interposed between the obtained positive electrode and negative electrode and cylindrically wound to provide a jelly roll. The jelly-roll was inserted in a 18650 case and injected with the electrolyte solution to provide a rechargeable lithium battery cell.

Example 2

A rechargeable lithium battery cell was fabricated in accordance with the same procedure as in Example 1, except that 70 wt % of the first positive active material of $LiCoO_2$, 15 wt % of the second positive active material of $LiMnO_2$, and 5 wt % of the third positive active material of activated carbon (AC, YP50, Kuraray Chemical Co., LTD., Osaka, Japan) are mixed to provide a positive active material.

Example 3

A rechargeable lithium battery cell was fabricated in accordance with the same procedure as in Example 1, except that 80 wt % of the first positive active material of $LiNi_{0.8}Co_{0.15}Al_{0.05}O_2$ (NCA, manufactured by Umicore, Brussels, Belgium) and 10 wt % of the second positive active material of $LiMnO_2$ were mixed to provide a positive active material.

Example 4

A rechargeable lithium battery cell was fabricated in accordance with the same procedure as in Example 1, except that 80 wt % of the first positive active material of $LiFePO_4$ (LFP, manufactured by Phostech Lithium, Candiac, Canada) and 10 wt % of the second positive active material of $LiMnO_2$ were mixed to provide a positive active material.

Example 5

Silicon monoxide (SiO purchased from Aldrich, St. Louis, Mo.) was pulverized with a ball mill to provide a SiO powder having an average particle diameter of 5 μm. The powder was introduced into a tube furnace and substituted under the argon atmosphere and heated until 1200° C. at a heating rate of 5° C./min. At a point of reaching 1200° C., the argon gas was replaced with a mixed gas of 50 volume % of argon gas and 50 volume % of methane gas and thermal-decomposed with methane gas for about 2 hours. After 2 hours, the mixed gas was replaced with argon gas and the material was cooled to room temperature to afford a negative active material in which 10 wt % of carbon was coated on the surface of SiO. A rechargeable lithium battery cell was fabricated in accordance with the same procedure as in Example 1, except that the obtained carbon-coated SiO was used as a negative active material and compressed until reaching the electrode thickness to 40 μm to provide a negative electrode.

Example 6

A rechargeable lithium battery cell was fabricated in accordance with the same procedure as in Example 1, except that 50 wt % of the first positive active material of $LiCoO_2$ and 40 wt % of the second positive active material of $LiMnO_2$ were used in a positive active material.

Example 7

A rechargeable lithium battery cell was fabricated in accordance with the same procedure as in Example 1, except that 60 wt % of the first positive active material of $LiCoO_2$ and 30 wt % of the second positive active material of $LiMnO_2$ were used in a positive active material.

Example 8

A rechargeable lithium battery cell was fabricated in accordance with the same procedure as in Example 1, except that 88 wt % of the first positive active material of $LiFePO_4$ and 2 wt % of the second positive active material of $LiMnO_2$ were used in a positive active material.

Example 9

A rechargeable lithium battery cell was fabricated in accordance with the same procedure as in Example 1, except that 30 wt % of the first positive active material of $LiCoO_2$, 30 wt % of the second positive active material of $LiMnO_2$, and 30 wt % of the third positive active material of activated carbon (YP50, Kuraray Chemical Co., LTD., Osaka, Japan) were mixed to provide a positive active material.

Comparative Example 1

A rechargeable lithium battery cell was fabricated in accordance with the same procedure as in Example 1, except that 90 wt % of only $LiCoO_2$ was used in a positive active material.

Comparative Example 2

A rechargeable lithium battery cell was fabricated in accordance with the same procedure as in Example 1, except that 90 wt % of only $LiNi_{0.8}Co_{0.15}Al_{0.05}O_2$ (NCA, manufactured by Umicore, Brussels, Belgium) was used in a positive active material.

Comparative Example 3

A rechargeable lithium battery cell was fabricated in accordance with the same procedure as in Example 1, except that 90 wt % of only $LiFePO_4$ (LFP, Phostech Lithium, Candiac, Canada) was used in a positive active material.

Comparative Example 4

A rechargeable lithium battery cell was fabricated in accordance with the same procedure as in Example 5, except that 90 wt % of only $LiCoO_2$ was used in a positive active material.

Experimental Example 1

Battery Evaluation

The rechargeable lithium battery cells obtained from the Examples 1 to 6 and Comparative Examples 1 to 4 were constant-current charged at a current of 0.3 A, and the charge was stopped at 4.2V of the battery voltage.

The cells were constant-current discharged at a current of 0.3 A, and the discharge was stopped at 2.0V of the battery voltage. This was set as the initial capacity.

Then it was constant-current charged at a current of 0.3 A, and the charge was finished at a point of reaching the battery voltage to 4.2V. The capacity was measured when discharging at a current of 15 A until 2.0V and set as a high-rate discharge characteristics.

Additionally, the cells were charged at a current of 6 A until 4.2V and then discharged at a current of 6 A until 2.0V, which was repeated 1000 times. The remained capacity % was calculated by dividing the 1000th discharge capacity by the initial discharge capacity.

The rechargeable lithium battery cells obtained from the Examples 1 to 6 and Comparative Examples 1 to 4 were constant-current charged at current of 0.3 A and finished at a point of reaching the battery voltage to 4.2V. At the charge state, the battery was disassembled to separate to a positive electrode, a negative electrode, and a separator. The obtained positive electrode was cleaned with EMC to wash the electrolyte attached to the electrode. After cleaning, the electrode was introduced into a vacuum drier to dry the EMC used in cleaning process. The obtained electrode was measured for the electric conductivity using a 4 probe instrument.

The results are shown in the following Table 1.

TABLE 1

| | Positive electrode | Negative electrode | Conductivity of positive electrode [S/m] | Capacity [mAh] | 10 C rate [%] | 4 C/4 C Cycle [%] |
|---|---|---|---|---|---|---|
| Example 1 | $LiCoO_2$ 75 wt % + $LiMnO_2$ 15 wt % | Hard carbon | 0.09 | 1350 | 85 | 84 |
| Example 2 | $LiCoO_2$ 70 wt % + $LiMnO_2$ 15 wt % + AC 5 wt % | Hard carbon | 0.11 | 1300 | 92 | 91 |
| Example 3 | NCA 80 wt % + $LiMnO_2$ 10 wt % | Hard carbon | 0.08 | 1430 | 83 | 86 |
| Example 4 | $LiFePO_4$ 80 wt % + $LiMnO_2$ 10 wt % | Hard carbon | 0.1 | 1035 | 86 | 89 |
| Example 5 | $LiCoO_2$ 75 wt % + $LiMnO_2$ 15 wt % | SiO | 0.09 | 1860 | 84 | 80 |
| Example 6 | $LiCoO_2$ 50 wt % + $LiMnO_2$ 40 wt % | Hard carbon | 0.10 | 1220 | 68 | 65 |
| Example 7 | $LiCoO_2$ 60 wt % + $LiMnO_2$ 30 wt % | Hard carbon | 0.09 | 1270 | 77 | 70 |
| Example 8 | $LiFePO_4$ 88 wt % + $LiMnO_2$ 2 wt % | Hard carbon | 0.04 | 1577 | 66 | 45 |
| Example 9 | $LiCoO_2$ 30 wt % + $LiMnO_2$ 30 wt % + AC 30 wt % | Hard carbon | 0.11 | 1090 | 86 | 64 |
| Comparative Example 1 | $LiCoO_2$ 90 wt % | Hard carbon | 0.02 | 1150 | 70 | 58 |
| Comparative Example 2 | $LiNi_{0.8}Co_{0.15}Al_{0.05}O_2$ 90 wt % | Hard carbon | 0.015 | 1280 | 68 | 50 |
| Comparative Example 3 | $LiFePO_4$ 90 wt % | Hard carbon | 0.04 | 880 | 71 | 61 |
| Comparative Example 4 | $LiCoO_2$ 90 wt % | SiO | 0.02 | 1580 | 66 | 45 |

As shown in Table 1, in the cases of Examples 1 to 6, the capacity, the rate capability, or the cycle-life characteristics were improved compared to the cases of Comparative Examples 1 to 4.

In the present disclosure, the terms "Example," "Comparative Example" and "Experimental Example" are used arbitrarily to simply identify a particular example or experimentation and should not be interpreted as admission of prior art. While the embodiments have been described in connection with what is presently considered to be practical exemplary embodiments, it is to be understood that the invention is not limited to the disclosed embodiments and is intended to cover various modifications and equivalent arrangements included within the spirit and scope of the appended claims. Therefore, the aforementioned embodiments should be understood to be exemplary but not limiting this disclosure in any way.

What is claimed is:

1. A positive active material for a rechargeable lithium battery, comprising:
   a first positive active material, wherein the first positive active material is $LiCoO_2$;
   a second positive active material including $Li_aMn_{1-x}M_xO_2$ (M is selected from Co, Ni, Fe, Cu, V, Si, Al, Sn, Pb, Sn, Ti, Sr, Mg, Ca or a combination thereof; x is 0≤x <1.0; and a is 0.9≤a≤1.1); and
   activated carbon as a third positive active material, wherein the third positive active material is included in an amount of about 1 wt % to about 30 wt % based on 100 wt % of positive active material.

2. The positive active material of claim 1, wherein the second positive active material is included in an amount of about 2 to about 40 wt % based on 100 wt % of the positive active material.

3. The positive active material of claim 1, wherein the second positive active material is included in an amount of about 2 wt % to about 30 wt % based on 100 wt % of the positive active material.

4. The positive active material of claim 1, wherein the second positive active material is a material of which structure is transformed from a layered structure to a spinel structure depending voltage increase at a first charge of a rechargeable lithium battery voltage.

5. A rechargeable lithium battery, comprising
   a positive electrode comprising the positive active material of claim 1;
   a negative electrode comprising a negative active material; and
   a non-aqueous electrolyte.

6. The rechargeable lithium battery of claim 5, wherein the non-aqueous electrolyte comprises a lithium salt and a non-aqueous organic solvent.

7. The positive active material of claim 1, wherein the second positive active material is included in an amount of about 2 wt % to about 15 wt % based on 100 wt % of the positive active material.

8. The positive active material of claim 1, wherein the second positive active material is included in an amount of about 10 wt % to about 15 wt % based on 100 wt % of the positive material.

9. A positive active material for a rechargeable lithium battery, comprising:
   a first positive active material, wherein the first positive active material is LiCoO$_2$; and
   a second positive active material including Li$_a$Mn$_{1-x}$M$_x$O$_2$ (M is selected from Co, Ni, or a combination thereof; x is 0≤x<1.0 and a is 0.9 ≤a ≤1.1), and
   activated carbon as a third positive active material, wherein the third positive active material is included is an amount of about 1 wt % to about 30 wt % based on 100 wt % of the positive active material.

\* \* \* \* \*